United States Patent
Walterick, Jr.

(10) Patent No.: US 6,534,550 B1
(45) Date of Patent: Mar. 18, 2003

(54) FOAM CONTROL COMPOSITION AND METHOD FOR CONTROLLING FOAM IN AQUEOUS SYSTEMS

(76) Inventor: Gerald C. Walterick, Jr., 24 Farmbrook Dr., Levittown, PA (US) 19055

( * ) Notice: Subject to any disclaimer, the term of this patent is extended or adjusted under 35 U.S.C. 154(b) by 0 days.

(21) Appl. No.: 09/537,104

(22) Filed: Mar. 29, 2000

(51) Int. Cl.[7] .......................... B01D 19/04; D21H 23/00
(52) U.S. Cl. .................. 516/77; 516/126; 516/132; 516/133; 516/134; 162/158; 162/179
(58) Field of Search ................... 516/126, 132, 516/77, 133, 134; 162/158, 179

(56) References Cited

U.S. PATENT DOCUMENTS

| | | | |
|---|---|---|---|
| 3,598,755 A | * 8/1971 | McBroom et al. | 516/134 |
| 4,000,340 A | * 12/1976 | Murphy et al. | 162/179 |
| 4,303,549 A | 12/1981 | Boylan | 516/116 |
| 4,340,500 A | 7/1982 | Boylan | 516/125 |
| 4,477,370 A | 10/1984 | Kavchok et al. | 516/121 |
| 4,626,377 A | 12/1986 | Kavchok et al. | 516/121 |
| 5,120,326 A | * 6/1992 | Hemling et al. | 8/598 |
| 5,366,654 A | * 11/1994 | Van Den Brom et al. | 510/514 |
| 5,460,698 A | 10/1995 | Nguyen | 516/131 |
| 5,536,884 A | * 7/1996 | Stoeckigt et al. | 516/134 |
| 5,562,862 A | 10/1996 | Berzansky, Jr. et al. | 516/133 |
| 5,679,286 A | 10/1997 | Wollenweber | 516/132 |
| 5,700,351 A | * 12/1997 | Schuhmacher et al. | 516/126 |
| 5,807,502 A | 9/1998 | Wollenweber et al. | 516/18 |
| 5,866,041 A | 2/1999 | Svarz et al. | 516/11 |
| 5,874,017 A | 2/1999 | Palmer et al. | 516/13 |

FOREIGN PATENT DOCUMENTS

| | | | |
|---|---|---|---|
| DE | 197 02 846 A1 | * | 7/1998 |
| WO | 96/25215 | * | 8/1996 |

OTHER PUBLICATIONS

Hawley's Condensed Chemical Dictionary, Eleventh Edition, (Van Nostrand Reinhold Company, NY, NY, copyright 1987) pp. 300 and 1147, Oct. 1989.*
WPI on EAST, week 199836, London: Derwent Publications, Ltd., AN 1998–415057, Class A25, DE 19702846 A1, (HENKEL KGAA) abstract, 1998.*
WPI on EAST, week 199918, London: Derwent Publications Ltd., AN 1996–393170, Class A25, WO9625215 A1, (HENKEL KGAA) abstract, 1999.*

* cited by examiner

Primary Examiner—Daniel S. Metzmaier
(74) Attorney, Agent, or Firm—Wegman, Hessler & Vanderburg

(57) ABSTRACT

The invention relates to methods and compositions for controlling foam, i.e., defoaming or inhibiting the formation thereof, in aqueous systems including wastewater systems and in aqueous industrial process systems by adding primary alcohol, alcohol alkoxylate, and emulsifier to the aqueous system, such as in a stable aqueous composition.

25 Claims, No Drawings

FOAM CONTROL COMPOSITION AND METHOD FOR CONTROLLING FOAM IN AQUEOUS SYSTEMS

BACKGROUND OF THE INVENTION

1. Field of the Invention

The present invention relates to foam control compositions, their preparation and use in aqueous media. Specifically, the invention relates to a defoamer composition particularly useful in controlling foam problems encountered in low to moderate temperature pulp and paper mill process and effluent water streams.

2. Discussion of Background Information

Many waste treatment systems and industrial processes have problems caused by foam that forms as the wastewater or process water flows through the system or process. Foam can occur in any aqueous stream that contains contaminants or additives that lower the surface tension of the stream. These materials are typically organic chemicals. They may be derived from natural chemicals (e.g., lignin, humic acid, tannin), waste chemicals, water treatment chemicals, process treatment chemicals, detergents, cleaners, products or byproducts of industrial processes, microbiological byproducts, etc. The system may also contain other materials that stabilize the foam after it has formed. Such materials include polymers, surfactants, suspended organic and inorganic solids, colloidal material, proteins, and microbiological organisms.

Foam problems frequently occur when a wastewater or process water stream is subjected to a unit operation that increases the total area of the system's gas/liquid interfaces. Such an increase occurs whenever a liquid is broken up into droplets or a gas is introduced into a liquid. Processes causing these effects include: mechanical processes (e.g., agitation, mixing, turbulent flow, pumping, aeration, gasification, reduction in pressure, increase in temperature), biological processes (e.g., fermentation, anaerobic digestion), and chemical processes (e.g., oxidation, recarbonation, gasification, distillation, solvent stripping, and reactions generating gas).

Foam in wastewater or process water is a problem for several reasons and can be detrimental to system processes (e.g., pumping, mixing, distillation, chemical reaction, heat transfer, evaporation, sedimentation, etc.). Foam can interfere with system sensors and controllers (e.g., level controllers, pH sensors, temperature sensors) and can adversely affect the quality and throughput of a product (e.g., holes in paper, and poor adhesion of coatings). Foam can also be a safety or health hazard (e.g., airborne bacteria, and tank overflows) or can also be an aesthetic problem, (e.g., foamy discharge to receiving streams).

The pulp and paper industry experiences some of the most troublesome foam problems because of the ubiquitous presence of lignins and other foam-causing materials. Foaming frequently occurs in pulp washing, pulp screening, pulp bleaching, and waste treatment processes. In addition to the visible foam that occurs on the surface of process and effluent streams, foam may also occur below the surface in the form of entrained air bubbles, particularly in aqueous streams that contain fibers and other particulates. Air bubbles become entrained when they cannot rise to the surface by normal buoyant forces because they are adsorbed to the particulate materials in the stream or their motion is impeded by the presence of the particulates. Entrained air bubbles are a problem because they inhibit the drainage of the washing liquor through the fiber mat which in turn slows down production. Entrained air bubbles are also known to impair paper formation and tensile strength.

SUMMARY OF THE INVENTION

The invention relates to defoaming agent compositions for controlling foam, i.e., defoaming or inhibiting the formation of foam, in aqueous environments, particularly in wastewater systems and aqueous industrial process systems.

The invention also relates to methods for controlling foam, i.e., defoaming or inhibiting the formation thereof, in aqueous environments, particularly in wastewater systems and in aqueous industrial process systems by adding to the system an effective amount of defoaming components, such as by adding the defoaming agent composition of the present invention.

In one aspect, the invention is directed to a method of at least one of defoaming an aqueous system and inhibiting the formation of foam in an aqueous system comprising adding to the aqueous system an effective amount of primary alcohol component that is solid at 25° C., alcohol alkoxylate component and emulsifier component to at least one of defoam the aqueous system and inhibit formation of foam in the aqueous system.

In another aspect, the present invention is directed to a stable defoamer composition comprising primary alcohol component that is solid at 25° C., alcohol alkoxylate component, emulsifier component and water.

The primary alcohol component can comprise at least one linear primary alcohol, and the at least one linear primary alcohol can comprise mixtures of primary linear alcohols. The mixture of primary linear alcohols can comprise $C_{14}$ to $C_{32}$ primary linear alcohols, more preferably $C_{18}$ to $C_{32}$ primary linear alcohols, and even more preferably $C_{18}$ to $C_{30}$ primary linear alcohols. Preferably, at least about 35 percent of the primary linear alcohols comprise $C_{20}$ to $C_{26}$ primary linear alcohols, more preferably at least about 70 percent of the primary linear alcohols comprise $C_{20}$ to $C_{26}$ primary linear alcohols, and even more preferably at least about 80 percent of the primary linear alcohols comprise $C_{20}$ to $C_{26}$ primary linear alcohols.

The primary alcohol component can have a melting point of at least about 40° C.

The primary alcohol can comprise at least one of fatty alcohols comprising at least one of palmityl alcohol, cetyl alcohol, stearyl alcohol, arachidyl alcohol, behenyl alcohol, lignoceryl alcohol, ceryl alcohol, montanyl alcohol, myricyl alcohol, melissyl alcohol, lacceryl alcohol and geddyl alcohol, and synthetic higher aliphatic alcohols comprising at least one of 1-hexadecanol, 1-octadecanol, 1-eicosanol, 1-docosanol, 1-tetracosanol, 1-hexacosanol, 1-octacosanol, 1-triacontanol, 1-dotriacontanol and 1-tetratriacontanol.

The alcohol alkoxylate component can comprise $C_{12}$ to $C_{18}$ alcohol alkoxylates, preferably $C_{12}$ to $C_{18}$ alcohol alkoxylates containing ethylene oxide groups and propylene oxide groups.

The alcohol alkoxylate component can have a cloud point of at least 16° C., with one cloud point range being about 20° C. to 38° C., and another cloud point range being about 22° C. to 25° C.

The alcohol alkoxylate component can have a molecular weight of at least about 630, more preferably about 630 to 3,000, and even more preferably about 1,200 to 3,000.

The emulsifier component can comprise at least one nonionic surfactant, and can additionally comprise at least one anionic surfactant.

At least one branched alcohol can be added. Moreover, at least one of stabilizing and thickening agents can be added.

The primary alcohol component, the alcohol alkoxylate component and the emulsifier component can be added by adding an aqueous defoaming composition to the aqueous system. The aqueous defoaming composition can comprise about 10 to 35 weight percent primary alcohol, about 2 to 12 weight percent alcohol alkoxylate, and about 0.2 to about 5 weight percent of emulsifier component.

The emulsifier component can comprise up to about 1.0 weight percent of at least one anionic surfactant, and from about 0.2 to 5.0 weight percent of at least one nonionic surfactant. The at least one nonionic surfactant can comprise at least one alcohol ethoxylate. Moreover, the emulsifier component can comprise at least one water soluble alcohol ethoxylate and at least one water insoluble alcohol ethoxylate.

The aqueous system can be, for example, a papermaking system.

Other exemplary embodiments and advantages of the present invention may be ascertained by reviewing the present disclosure.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to describe the present invention in more detail than is necessary for the fundamental understanding of the present invention, the description making apparent to those skilled in the art how the several forms of the present invention may be embodied in practice.

Unless otherwise stated, all percentages, parts, ratios, etc., are by weight. Moreover, unless otherwise stated, percent measurements in this application are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

A significant improvement in the control of foaming in aqueous process and effluent streams can be accomplished by the use of a foam control composition, which is the subject of the present invention. The primary focus of this composition is the enhanced foam control efficacy resulting from the combination of a primary alcohol component and an alcohol alkoxylate component. The use of these two materials in combination enables an unexpected increase in both defoaming and inhibition of formation of foam as compared to conventional compositions.

The invention also relates to methods for controlling foam, i.e., defoaming and/or inhibiting the formation thereof, in aqueous environments, particularly in wastewater systems and in aqueous industrial process systems, by adding to the system a defoaming agent composition which includes a primary alcohol component and an alcohol alkoxylate component.

The primary alcohol component useful in this invention includes any primary alcohol that is solid at room temperature, i.e., 25° C. Preferably, the primary alcohol component comprises at least one linear primary alcohol, and preferably comprises mixtures of primary linear alcohols. Even more preferably, the linear primary alcohols comprise $C_{14}$ to $C_{32}$ primary linear alcohols, more preferably $C_{18}$ to $C_{32}$ primary linear alcohols, and even more preferably $C_{18}$ to $C_{30}$ primary linear alcohols.

When the primary alcohol component comprises a mixture of primary linear alcohols, it is preferred that at least about 35 percent of the primary linear alcohols comprise $C_{20}$ to $C_{26}$ primary linear alcohols, more preferably at least about 70 percent of the primary linear alcohols comprise $C_{20}$ to $C_{26}$ primary linear alcohols, and even more preferably at least about 80 percent of the primary linear alcohols comprises $C_{20}$ to $C_{26}$ primary linear alcohols.

Preferably, the primary alcohol component has a melting point of at least about 40° C. Thus, for example, when the primary alcohol component comprises a mixture of primary linear alcohols, the mixture will have a preferred melting point of at least about 40° C.

Primary alcohols according to the present invention include, but are not limited to, those described in U.S. Pat. Nos. 4,340,500 and 5,679,286, which are incorporated by reference herein in their entirety.

Alcohols suitable for the purpose of this invention may be known in industry as "fatty alcohols", if they are derived from natural oleochemical source materials, or as "synthetic higher aliphatic alcohols", if they are derived from petrochemical source materials. Examples of fatty alcohols suitable for the purposes of this invention include, but are not limited to, palmityl alcohol, cetyl alcohol, stearyl alcohol, arachidyl alcohol, behenyl alcohol, lignoceryl alcohol, ceryl alcohol, montanyl alcohol, myricyl alcohol, melissyl alcohol, lacceryl alcohol and geddyl alcohol, as well as mixtures thereof Suitable synthetic higher aliphatic alcohols include, but are not limited to, those made by the Oxo process and those made by the Ziegler process. Examples of synthetic higher aliphatic alcohols suitable for the purposes of this invention include, but are not limited to, 1-hexadecanol, 1-octadecanol, 1-eicosanol, 1-docosanol, 1-tetracosanol, 1-hexacosanol, 1-octacosanol, 1-triacontanol, 1-dotriacontanol and 1-tetratriacontanol, as well as mixtures thereof. The preferred compounds for the primary linear alcohol component are synthetic higher aliphatic alcohols having from about 14 to about 32 carbon atoms, preferably those having from 18 to 32 carbon atoms, and most preferably those having from about 18 to about 30 carbon atoms.

Commercial examples of the preferred linear primary alcohol component include, but are not limited to, Alfol 20+ (manufactured by Condea-Vista, Houston, Tex.), Nafol 20+, Nafol 20+A, Nafol 22+ and Nafol 2022 (all manufactured by Condea Chemie, Brunnsbutel, Germany), and Epal 20+ (manufactured by Amoco Chemicals, Chicago, Ill.). The preferred linear primary alcohol component may be commercially described as the still bottom product of $C_{12}$ through $C_{18}$ alcohol manufacturing production. As such this component may contain impurities such as $C_{22}$ to $C_{40}$ hydrocarbons in concentrations of about 25–40 percent by weight. The presence of such impurities does not prevent the composition from controlling foam.

The alcohol alkoxylate component according to the present invention can comprise one or more alcohol alkoxylates which function with the primary alcohol component to enable defoaming and/or the inhibition of the formation of foam. The alcohol alkoxylates of the present invention can include combinations of alkoxylates that add both hydrophobic and hydrophilic groups to the alcohol alkoxylate. For example, the alcohol alkoxylates preferably at least include ethylene oxide groups, which comprise the hydrophilic groups, and propylene oxide groups, which comprise the hydrophobic groups. The alcohol alkoxylate also contains a linear or branched alkyl chain containing 12 to 18 carbons. This alkyl chain is also a hydrophobic group. The alcohol alkoxylate preferably has a larger proportion of hydrophobic groups, such as but not limited to the propylene oxide groups, so that The alcohol alkoxylate can be considered to have an overall hydrophobic characteristic even though the alcohol alkoxylate contains hydrophilic and hydrophobic groups.

Preferably, the alcohol alkoxylates comprise $C_{12}$ to $C_{18}$ alcohol alkoxylates, with one preferred range being $C_{12}$ to $C_{14}$, and another preferred range being $C_{14}$ to $C_{18}$. More preferably the alcohol alkoxylates comprise $C_{12}$ to $C_{18}$ alcohol alkoxylates containing ethylene oxide groups and propylene oxide groups, with one preferred range being $C_{12}$ to $C_{14}$, and another preferred range being $C_{14}$ to $C_{18}$. Preferably, the alcohol alkoxylates have a cloud point of at least 16° C., with one preferred range being about 20° C. to about 38° C., and another preferred range being about 22° C. to 25° C. Preferably, the alcohol alkoxylate has a molecular weight of at least 630, with preferred ranges being about 630 to 3,000, and about 1,200 to 3,000.

Alcohol alkoxylates useful in the present invention include, but are not limited to, $C_{12}$ to $C_{18}$ alcohol alkoxylates such as disclosed in U.S. Pat. Nos. 5,562,862 and 5,460,698, whose disclosures are incorporated by reference herein in their entireties. These $C_{12}$ to $C_{18}$ alcohol alkoxylates may include fatty alcohol ethoxylate/propoxylates which have a cloud point of at least 16° C., preferably about 22° C. to about 25° C., and a molecular weight of from about 1,200 to about 3,000. The fatty alcohol ethoxylate/propoxylates have a chemical structure represented by the following formula:

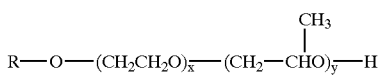

where R is linear or branched chain alkyl having from about 12 to about 18 carbon atoms, preferably a $C_{14}$ to $C_{18}$ mixture; x is from about 2 to about 20; and y is from about 1 to about 40.

Also suitable as the alcohol alkoxylate component of the present invention are secondary alcohol ethoxylate/propoxylates which have a cloud point of about 20° C. to about 38° C. and a molecular weight of at least 630. These materials have a chemical structure represented by the following formula:

where R is linear or branched chain alkyl having from about 11 to about 15 carbon atoms, preferably a $C_{11}$ to $C_{15}$ or $C_{12}$ to $C_{14}$ mixture; x is from about 1 to about 6; y is from about 1 to about 3.

Examples of preferred alcohol alkoxylate component include ethoxylated/propoxylated alcohols manufactured by Deforest Enterprises (Boca Raton, Fla.), such as Delonic LF-EP; Harcros Chemicals, Inc. (Kansas City, Kans.), such as T-Det LF-416; Henkel Corp. (Cincinnati, Ohio), such as Dehypon LS-54 and Dehypon LS-45; Huntsman Chemical, (Houston, Tex.), such as the Surfonic alcohol alkoxylates, including Surfonic LF-27, Surfonic LF-47 and Surfonic LF-50; Rhodia, Inc. (Cranbury, N.J.), such as, Antarox LF-224 and Antarox BL; and Union Carbide (Danbury, Conn.), such as the Tergitol Minifoams alcohol alkoxylates, including Tergitol Minifoam 1X and Tergitol Minifoam 2X.

The composition according to the present invention also includes an emulsifying agent component. The emulsifying agent component can comprise one or more of any emulsifier capable of dispersing the primary alcohol component and the alcohol alkoxylate into aqueous media. The at least one emulsifying agent component can be present at any concentration that enables the dispersion of the components into the aqueous media. Preferably, the concentration of the emulsifying agent component is from about 0.2 to 5.0 weight percent, more preferably, the concentration of the emulsifying agent component is from about 0.5 to 3 weight percent.

The emulsifying agent component preferably comprises at least one nonionic surfactant. The nonionic surfactant that can be used in the emulsifying agent component of the present invention can include, but is not limited to, alcohol ethoxylates, fatty acid ethoxylates, alkyl phenol ethoxylates, sorbitan esters, sorbitan ester ethoxylates, ethylene oxide/propylene oxide copolymers, glycol esters, glyceryl esters, polyglycerides and polyoxyalkylene glyceride esters. A preferred nonionic surfactant is alcohol ethoxylate, such as Tergitol 15-S series (Manufactured by Union Carbide, Danbury, Conn.), Neodol 23-series and Neodol 25-series (manufactured by Shell Chemicals, Houston, Tex.), Macol LA-series (manufactured by BASF Corp., Mt. Olive, N.J.), Makon TD-series (manufactured by Stepan Co., Northfield, Ill.), Surfonic L-series (manufactured by Huntsman Chemical, Houston, Tex.), Tomadol 25-series (manufactured by Tomah Products Inc., Reserve, La.), Alfonic 1216-series and Alfonic 1416-series (manufactured by Condea-Vista, Houston, Tex.). It is noted that the nonionic surfactant can be water soluble and/or water insoluble, such as water soluble and water insoluble alcohol ethoxylates.

The emulsifying agent component of the present invention can also include anionic surfactants which include, but are not limited to, alcohol sulfates; alkylaryl sulfonates; alkyl benzene sulfonates: ethoxylated alcohol sulfates; sulfates and sulfonates of ethoxylated alkyl phenols; sulfates of fatty esters; sulfates and sulfonates of alkyl phenols; sulfonates of condensed naphthalenes; sulfonates of naphthalene; sodium derivatives of sulfo-succinates; alkali salts of petroleum sulfonates; alkali phosphate esters and the like. Preferred anionic surfactants include sodium dodecylbenzene sulfonate, triethanolamine dodecylbenzene sulfonate, and sodium dioctyl sulfosuccinate. The anionic surfactant may be present in the subject defoamer composition at a concentration from 0 to about 1 weight percent of the total composition.

Thus, the emulsifying agent component preferably comprises at least one nonionic surfactant, and can contain at least one anionic surfactant in combination with the at least one nonionic surfactant.

The composition preferably includes from about 10 to about 35 weight percent primary alcohol, from about 2 to about 12 weight percent alcohol alkoxylate, and from about 0.2 to about 5 weight percent of at least one emulsifying agent component, and the balance being water.

Still further, the composition according to the present invention can also contain other additives, such as additives conventionally incorporated into defoaming compositions.

For example, the composition according to the present invention can contain branched alcohol, such as, but not limited to, 2-ethyl-1-hexanol, 2 butyl-octanol, 2-hexyl-decanol, 2-octyl-dodecanol, 2-decyl-tetradecanol. Branched alcohols can be present in the composition in varying amounts, preferably from 0 to about 2 percent by weight, more preferably up to about 1.1 percent by weight.

Stabilizing and/or thickening agents can also be added to the composition according to the present invention in order to prevent phase separation of the composition during storage. Stabilizing/thickening agents suitable for use in the present invention include, but are not limited to, xanthan gum, poly(acrylic acid), high molecular weight polyacrylates, naturally derived gums, carboxymethyl cellulose, hydroxyethyl cellulose, hectorite clay and the like. The stabilizing/thickening agent can be present in the defoamer composition at varying concentrations, preferably from 0 to about 2 percent by weight. A preferred stabilizer/thickening agent is xanthan gum.

When a stabilizing/thickening agent is included in the composition, an alkaline material may be added as recommended by the manufacturer of the stabilizing/thickening agent to facilitate hydration thereof. Examples of alkaline materials suitable for this purpose include sodium hydroxide, ammonium hydroxide, triethanola The composition according to the present invention may also contain at least one preservative to prevent or inhibit microbiological activity during product storage. Suitable preservatives include, but are not limited to, benzisothiazolinone, glutaraldehyde, methyl paraben, propyl paraben, isothiazolinone, and mixtures thereof. The preservative can be present in the defoamer composition at varying concentrations, preferably from 0 to about 0.1 weight percent. A preferred preservative is Proxel GXL (1,2-benzisothiazolin-3-one) manufactured by Zeneca, Wilmington, Del.

The defoaming agent composition of the present invention is suitable for defoaming or inhibiting the formation of foam in a wide variety of aqueous systems; however, it has been found that such a defoaming agent has particular applicability to the pulp and paper industry and the textile industry and is especially useful for controlling foam in process waters and wastewater effluents from these industries. The defoaming agent composition of the present invention can be added to the aqueous system in an effective amount to destroy existing foam and/or inhibit the formation of new foam, generally being added in an amount to provide at least 1 part by volume of defoaming agent per million parts by volume of aqueous system liquid. In general, no added beneficial effect is obtained by the use of amounts greater than 500 parts by volume of defoaming agent per million parts of aqueous system liquid. It is to be understood that the specific amount to be employed will vary with each system, and the selection of an optimum amount is deemed to be within the scope of those skilled in the art; however, it is noted that a preferred range is about 5 to 100 parts by volume defoaming agent per million parts of aqueous system liquid.

EXAMPLES

The invention is illustrated in the following non-limiting examples, which are provided for the purpose of representation, and are not to be construed as limiting the scope of the invention. All parts and percentages in the examples are by weight unless indicated otherwise.

Example Compositions 1–32

Several defoaming agent compositions prepared in accordance with the present invention are shown in Table 1. The percentage of each component is by weight percent.

TABLE 1

DEFOAMING AGENT COMPOSITIONS

| Ex. No. | Water (wt %) | Linear Alcohol Mixture | Linear Alcohol Mixture (%) | Alcohol Alkoxylate | Alcohol Alkoxylate (%) | Anionic Surfactant | Anionic Surfactant (%) | Nonionic Surfactant | Nonionic Surfactant (%) | Branched Alcohol | Branched Alcohol (%) | Xanthan Gum (%) |
|---|---|---|---|---|---|---|---|---|---|---|---|---|
| 1 | 62 | Alfol 20+ | 30 | Surfonic LF-50 | 5 | Nacconol 90G | 0.5 | Tergitol 15-S-9 | 1.6 | Isofol 20 | 1.1 | 0 |
| 2 | 62 | Alfol 20+ | 30 | Surfonic LF-27 | 5 | Nacconol 90G | 0.6 | Tergitol 15-S-9 | 1.6 | Isofol 20 | 1.1 | 0 |
| 3 | 62 | Alfol 20+ | 30 | Surfonic LF-47 | 5 | Nacconol 90G | 0.5 | Tergitol 15-S-9 | 1.7 | Isofol 20 | 1.1 | 0 |
| 4 | 62 | Alfol 20+ | 30 | Tergitol Minfoam 1X | 5 | Nacconol 90G | 0.5 | Tergitol 15-S-9 | 1.5 | Isofol 20 | 1.0 | 0 |
| 5 | 62 | Alfol 20+ | 30 | Tergitol Minfoam 2X | 5 | Nacconol 90G | 0.5 | Tergitol 15-S-9 | 1.6 | Isofol 20 | 1.1 | 0 |
| 6 | 56 | Alfol 20+ | 35 | Surfonic LF-50 | 5 | Nacconol 90G | 1 | Tergitol 15-S-9 | 1.6 | Isofol 20 | 1.1 | 0 |
| 7 | 61 | Alfol 20+ | 30 | Surfonic LF-50 | 5 | Nacconol 90G | 1 | Tergitol 15-S-9 | 1.5 | Isofol 20 | 1.1 | 0 |
| 8 | 66 | Alfol 20+ | 25 | Surfonic LF-50 | 5 | Nacconol 90G | 1 | Tergitol 15-S-9 | 1.5 | Isofol 20 | 1.0 | 0 |
| 9 | 71 | Alfol 20+ | 20 | Surfonic LF-50 | 5 | Nacconol 90G | 1 | Tergitol 15-S-9 | 1.6 | Isofol 20 | 1.0 | 0 |
| 10 | 76 | Alfol 20+ | 15 | Surfonic LF-50 | 5 | Nacconol 90G | 1 | Tergitol 15-S-9 | 1.6 | Isofol 20 | 1.0 | 0 |
| 11 | 56 | Alfol 20+ | 35 | Surfonic LF-50 | 5 | Nacconol 90G | 1 | Tergitol 15-S-9 | 1.7 | 2-ethyl-1-hexanol | 1.1 | 0 |
| 12 | 61 | Alfol 20+ | 30 | Surfonic LF-50 | 5 | Nacconol 90G | 1 | Tergitol 15-S-9 | 1.6 | 2-ethyl-1-hexanol | 1.1 | 0 |

TABLE 1-continued

DEFOAMING AGENT COMPOSITIONS

| Ex. No. | Water (wt %) | Linear Alcohol Mixture | Linear Alcohol Mixture (%) | Alcohol Alkoxylate | Alcohol Alkoxylate (%) | Anionic Surfactant | Anionic Surfactant (%) | Nonionic Surfactant | Nonionic Surfactant (%) | Branched Alcohol | Branched Alcohol (%) | Xanthan Gum (%) |
|---|---|---|---|---|---|---|---|---|---|---|---|---|
| 13 | 66 | Alfol 20+ | 25 | Surfonic LF-50 | 5 | Nacconol 90G | 1 | Tergitol 15-S-9 | 1.6 | 2-ethyl-1-hexanol | 1.1 | 0 |
| 14 | 71 | Alfol 20+ | 20 | Surfonic LF-50 | 5 | Nacconol 90G | 1 | Tergitol 15-S-9 | 1.6 | 2-ethyl-1-hexanol | 1.0 | 0 |
| 15 | 76 | Alfol 20+ | 15 | Surfonic LF-50 | 5 | Nacconol 90G | 1 | Tergitol 15-S-9 | 1.5 | 2-ethyl-1-hexanol | 1.1 | 0 |
| 16 | 66 | Alfol 20+ | 25 | Surfonic LF-50 | 5 | Nacconol 90G | 1 | Tergitol 15-S-9 | 1.6 | Isofol 20 | 1.1 | Kelzan S 0.1 |
| 17 | 66 | Alfol 20+ | 25 | Surfonic LF-50 | 5 | Nacconol 90G | 1 | Tergitol 15-S-9 | 1.6 | Isofol 20 | 1.0 | Kelzan S 0.2 |
| 18 | 66 | Alfol 20+ | 25 | Surfonic LF-50 | 5 | Nacconol 90G | 1 | Tergitol 15-S-9 | 1.6 | Isofol 20 | 1.1 | Kelzan S 0.3 |
| 19 | 67 | Alfol 20+ | 25 | Surfonic LF-50 | 5 | Nacconol 90G | 1 | Tergitol 15-S-9 | 1.5 | — | 0 | Kelzan S 0.1 |
| 20 | 67 | Alfol 20+ | 25 | Surfonic LF-50 | 5 | Nacconol 90G | 1 | Tergitol 15-S-9 | 1.5 | — | 0 | Kelzan S 0.2 |
| 21 | 67 | Alfol 20+ | 25 | Surfonic LF-50 | 5 | Nacconol 90G | 1 | Tergitol 15-S-9 | 1.6 | — | 0 | Kelzan S 0.3 |
| 22 | 66 | Alfol 20+ | 25 | Surfonic LF-50 | 6 | Nacconol 90G | 1 | Tergitol 15-S-9 | 1.6 | — | 0 | Kelzan S 0.2 |
| 23 | 65 | Alfol 20+ | 25 | Surfonic LF-50 | 7 | Nacconol 90G | 1 | Tergitol 15-S-9 | 1.5 | — | 0 | Kelzan S 0.2 |
| 24 | 64 | Alfol 20+ | 25 | Surfonic LF-50 | 8 | Nacconol 90G | 1 | Tergitol 15-S-9 | 1.6 | — | 0 | Kelzan S 0.2 |
| 25 | 63 | Alfol 20+ | 25 | Surfonic LF-50 | 9 | Nacconol 90G | 1 | Tergitol 15-S-9 | 1.6 | — | 0 | Kelzan S 0.2 |
| 26 | 62 | Alfol 20+ | 25 | Surfonic LF-50 | 10 | Nacconol 90G | 1 | Tergitol 15-S-9 | 1.6 | — | 0 | Kelzan S 0.2 |
| 27 | 85.5 | Alfol 20+ | 10 | Surfonic LF-50 | 2 | Nacconol 90G | 1 | Tergitol 15-S-9 | 1.8 | — | 0 | Kelzan S 0.3 |
| 28 | 67 | Alfol 20+ | 25 | Surfonic LF-50 | 6 | Monawet MO85P | 0.5 | Tergitol 15-S-9 | 1.5 | — | 0 | Kelzan S 0.1 |
| 29 | 74.5 | Alfol 20+ | 12 | Surfonic LF-50 | 12 | Nacconol 90G | 0 | Tergitol 15-S-9 | 1.5 | — | 0 | Kelzan S 0.2 |
| 30 | 74 | Alfol 20+ | 18 | Surfonic LF-50 | 6 | Calsoft T-60 | 0.6 | Tergitol 15-S-9 | 1.5 | — | 0 | Kelzan S 0.2 |
| 31 | 74 | Alfol 20+ | 18 | Surfonic LF-50 | 6 | Calsoft T-60 | 1.0 | Tergitol 15-S-9 | 1.5 | — | 0 | Kelzan S 0.2 |
| 32 | 74.5 | Alfol 20+ | 12 | Surfonic LF-50 | 12 | Nacconol 90G | 0 | Tergitol 15-S-3 and Tergitol 15-S-12 | 0.2 1.3 | — | 0 | Kelzan S 0.2 |

Alfol 20+ is a primary alcohol mixture containing primarily $C_{16}$ to $C_{32}$ alcohols, manufactured by Condea-Vista, Houston, Tex.

Surfonic LF-50 is a $C_{14}$–$C_{18}$ alcohol alkoxylate manufactured by Huntsman Chemical, Houston, Tex.

Surfonic LF-27 is a $C_{16}$–$C_{18}$ alcohol alkoxylate manufactured by Huntsman Chemical Houston, Tex.

Surfonic LF-47 is an alcohol alkoxylate manufactured by Huntsman Chemical Houston, Tex.

Tergitol Minfoam 1X is a $C_{12}$–$C_{14}$ alcohol alkoxylate manufactured by Union Carbide Danbury, Conn.

Tergitol Minfoam 2X is a $C_{12}$–$C_{14}$ alcohol alkoxylate manufactured by Union Carbide Danbury, Conn.

Nacconol 90G is a sodium dodecylbenzene sulfonate anionic surfactant manufactured by Stepan Chemicals, Maywood, N.J.

Monawet MO85P is a sodium dioctyl sulfosuccinate anionic surfactant manufactured by Uniqema, Paterson, N.J.

Calsoft T-60 is a triethanolamine dodecyl benzene sulfonate anionic surfactant manufactured by Stepan Chemicals, Maywood, N.J.

Tergitol 15-S-9 is a secondary alcohol ethoxylate nonionic surfactant manufactured by Union Carbide, Danbury, Conn.

Tergitol 15-S-3 and Tergitol 15-S-12 are both secondary alcohol ethoxylates nonionic surfactants manufactured by Union Carbide, Danbury, Conn.

Isofol 20 is a branched alcohol-2-octyl dodecanol manufactured by Condea-Vista, Houston, Tex.

2-ethyl-1-hexanol is a branched alcohol supplied by Fluka Chemicals, Milwaukee, Wis.

Kelzan S is a dispersible xanthan gum manufactured by Kelco Industrial Biopolymers, San Diego, Calif. 0.06–0.07 wt % ammonium hydroxide was added to the water along with the xanthan gum.

Preparation of Test Substrate and Discussion of Foaming Test Procedure

Tests to evaluate the foam control efficacy of compositions are conducted using a lab-prepared substrate containing contaminants representative of those that would be present in a typical Pulp and Paper Industry wastewater. The test substrate is prepared from a concentrated stock solution that has the composition shown in Table 2.

TABLE 2

STOCK SOLUTION USED TO PREPARE TEST SUBSTRATE

| Component | Parts by Weight |
|---|---|
| deionized water | 89.3 |
| sodium carbonate | 5.0 |
| sodium sulfate | 0.2 |
| sodium hydroxide | 0.3 |
| Indulin AT unsulfonated Kraft lignin | 5.0 |
| Pamak 4 (tall oil fatty acid) | 0.2 |

Indulin AT unsulfonated Kraft lignin is manufactured by WestVaco, Charleston Heights, S.C.

Pamak 4 (tall oil fatty acid) is manufactured by Hercules Incorporated, Wilmington, Del.

To prepare the test substrate, the stock solution is diluted to 2.0 weight percent in deionized water and the pH is adjusted with 50% sulfuric acid to 7.0±0.2.

Tests are conducted with this substrate using an apparatus designed to generate foam by simulating the mixing intensity that a typical Pulp and Paper Industry wastewater might be subjected to in a full-scale waste treatment plant. The apparatus includes a 1.0-liter glass reservoir, a 1-inch inside diameter×24-inch long open-ended glass column, a peristaltic pump, tubing, and a 4-inch long stainless steel needle with a 1 mm diameter opening. The column is clamped in a vertical position with its lower end centered in the reservoir, 0.5 inch above the bottom. Tubing runs from inside the reservoir, through the pump to the needle, which is clamped at the top of the column and aimed to discharge down the center of the column. A rubber septum for injecting chemical additives is fitted to a glass tee inserted in the tubing between the reservoir and the pump. This apparatus is a scaled-down modification of the Dynamic Foam Meter used for measuring foam formation in the detergent industry as described by Reich, Patton and Francis in "Soap and Chemical Specialties", April, 1961, p55.

Foam is generated with this apparatus by adding 1.0 liter of test substrate to the reservoir and pumping the substrate from the reservoir to the needle where it discharges in a steady narrow stream down the center of the column. When substrate discharging from the needle impinges on the liquid surface in the reservoir, foam is generated in the column. The amount of foam produced is quantified by measuring the height of foam in the column.

Each evaluation involves first determining the amount of foam generated by the test substrate containing no chemical treatment. This value, defined as the "untreated foam height", is determined by circulating the substrate for 1 minute at 350 ml/minute.

After measuring the untreated foam height, the effect on foam height resulting from the addition of a defoaming agent is determined by adding a measured amount of agent to the substrate as the substrate continues to be circulated at 350 ml/minute. The agent is added through the injection septum positioned in the tubing between the reservoir and the pump. The agent becomes dispersed in the substrate as the substrate flows through the tubing. The dispersed agent then discharges with the circulating substrate from the needle onto the top of the foam in the column. The most effective defoaming agents produce an immediate drop in the foam height as foam is destroyed on contact with the agent. After the treatment agent is added, the substrate is kept recirculating at 350 ml/minute and the foam height is recorded at 1 minute intervals for 10 minutes.

The measured foam height values are used to calculate the % reduction of foam relative to the untreated foam height. The % foam reduction at 1 minute after addition of the defoamer/antifoam agent is used as an indication of the defoaming (or "foam knockdown") ability of the agent. Greater foam reductions are indicative of better defoamers. The % foam reduction after recirculating the treated substrate for 10 minutes is used as an indication of the antifoaming (or "foam holddown") ability of the agent.

Test Results for Example and Comparative Compositions

Results of tests conducted with 10 ppm of the composition are shown in Table 3 for each of the compositions described in Table 1. Also shown in Table 3 are results of similar tests conducted in control A and control B, which, respectively, have dosages of 10 and 25 ppm using Foamtrol AF3550, a currently commercial, "state of the art" antifoam product, which is manufactured by BetzDearbom Inc., Trevose, Pa. Foamtrol AF3550 antifoam product contains a mixture of $C_{18}$ to $C_{32}$ linear primary alcohols but does not contain alcohol alkoxylate. All of the Example 1 to 32 compositions contain both $C_{18}$ to $C_{32}$ linear primary alcohols and alcohol alkoxylate. Comparison of the performance data of controls A and B containing Foamtrol AF3550 antifoam product to the performance data of the defoamer compositions of Examples 1 to 32 clearly demonstrates the enhanced foam control efficacy resulting from the presence of the alcohol alkoxylate in the compositions of the present invention.

TABLE 3

TEST RESULTS

| Composition No. | Dosage Added (ppm) | Defoaming Efficacy (% Foam Reduction @ 1 min.) | Antifoaming Efficacy (% Foam Reduction @ 10 min.) |
|---|---|---|---|
| Control A containing Foamtrol AF3550 | 10 | 80 | 32 |
| Control B containing Foamtrol AF3550 | 25 | 84 | 70 |
| 1 | 10 | 94 | 91 |
| 2 | 10 | 93 | 84 |
| 3 | 10 | 89 | 79 |
| 4 | 10 | 89 | 77 |
| 5 | 10 | 89 | 75 |
| 6 | 10 | 90 | 88 |
| 7 | 10 | 86 | 84 |
| 8 | 10 | 88 | 86 |
| 9 | 10 | 90 | 85 |
| 10 | 10 | 76 | 63 |
| 11 | 10 | 90 | 88 |
| 12 | 10 | 90 | 88 |
| 13 | 10 | 86 | 80 |
| 14 | 10 | 88 | 82 |
| 15 | 10 | 82 | 74 |
| 16 | 10 | 89 | 85 |
| 17 | 10 | 89 | 85 |
| 18 | 10 | 89 | 83 |
| 19 | 10 | 85 | 78 |
| 20 | 10 | 91 | 87 |
| 21 | 10 | 87 | 81 |
| 22 | 10 | 85 | 85 |
| 23 | 10 | 85 | 85 |
| 24 | 10 | 85 | 85 |

TABLE 3-continued

TEST RESULTS

| Composition No. | Dosage Added (ppm) | Defoaming Efficacy (% Foam Reduction @ 1 min.) | Antifoaming Efficacy (% Foam Reduction @ 10 min.) |
|---|---|---|---|
| 25 | 10 | 84 | 84 |
| 26 | 10 | 90 | 88 |
| 27 | 10 | 65 | 61 |
|    | 25 | 78 | 83 |
| 28 | 10 | 88 | 94 |
| 29 | 10 | 80 | 72 |
| 30 | 10 | 88 | 67 |
| 31 | 10 | 86 | 77 |
| 32 | 10 | 85 | 68 |

As demonstrated by the data shown in Table 3, all of the subject compositions of Examples 1 to 32 are very effective as both defoamers and antifoams. The subject compositions of Examples 1 to 32 all achieve significantly better foam holddown (% foam reduction at 10 minutes) than controls A and B using Foamtrol AF3550 antifoam product. All Examples except 10 and 27 are also capable of achieving equivalent or better foam knockdown (% foam reduction at 1 minute) than controls A and B containing Foamtrol AF3550 antifoam product.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of controlling foam in an aqueous system comprising adding to said system an effective defoaming amount of an aqueous foam control composition, where said aqueous foam control composition comprises:
   (a) a linear primary alcohol component having from about 14 to 34 carbon atoms and existing in solid state at 25° C.;
   (b) an alcohol ethoxylate/propoxylate compound containing a linear or branched chain alkyl group; and
   (c) an emulsifier component selected from the group consisting of anionic surfactant and non-ionic surfactants, the non-ionic surfactants being selected from the group consisting of alcohol ethoxylates, fatty acid ethoxylates, alkyl phenol ethoxylates, sorbitan esters, sorbitan ester ethoxylates, ethylene oxide/propylene oxide copolymers, glycol esters, glycerol esters, polyglycerides and polyoxyalkylene glyceride esters; and
wherein said aqueous foam control composition comprises about 10 to 35 weight percent of the linear primary alcohol component (a), about 2 to 12 weight percent of the alcohol ethoxylate/propoxylate compound (b), and about 0.2 to about 5 weight percent of the emulsifier component (c).

2. The method according to claim 1 wherein the linear primary alcohol component comprises mixtures of primary linear alcohols.

3. The method according to claim 2 wherein the mixture of primary linear alcohols comprises $C_{14}$ to $C_{32}$ primary linear alcohols.

4. The method according to claim 3 wherein the mixture of primary linear alcohols comprises $C_{18}$ to $C_{32}$ primary linear alcohols.

5. The method according to claim 4 wherein the mixture of primary linear alcohols comprises $C_{18}$ to $C_{30}$ primary linear alcohols.

6. The method according to claim 3 wherein at least about 35 percent of the primary linear alcohols comprise $C_{20}$ to $C_{26}$ primary linear alcohols.

7. The method according to claim 6 wherein at least about 70 percent of the primary linear alcohols comprise $C_{20}$ to $C_{26}$ primary linear alcohols.

8. The method according to claim 7 wherein at least about 80 percent of the primary linear alcohols comprise $C_{20}$ to $C_{26}$ primary linear alcohols.

9. The method of claim 1 wherein the linear primary alcohol component has a melting point of at least 40° C.

10. The method according to claim 1 wherein the linear primary alcohol component comprises at least one of fatty alcohols comprising at least one of palmityl alcohol, cetyl alcohol, stearyl alcohol, arachidyl alcohol, behenyl alcohol, lignoceryl alcohol, ceryl alcohol, montanyl alcohol, myricyl alcohol, melissyl alcohol, lacceryl alcohol and geddyl alcohol, and synthetic higher aliphatic alcohols comprising at least one of 1-hexadecanol, 1-octadecanol, 1-eicosanol, 1-docosanol, 1-tetracosanol, 1-hexacosanol, 1-octacosanol, 1-triacontanol, 1-dotriacontanol and 1-tetratriacontanol.

11. The method according to claim 1 wherein the alcohol ethoxylate/propoxylate component comprises $C_{12}$ to $C_{18}$ ethoxylate/propoxylate.

12. The method according to claim 1 wherein the alcohol ethoxylate/propoxylate component has a cloud point of at least 16° C.

13. The method according to claim 12 wherein the alcohol ethoxylate/propoxylate component has a cloud point of about 20° C. to 38° C.

14. The method according to claim 12 wherein the alcohol ethoxylate/propoxylate component has a cloud point of about 22° C. to 25° C.

15. The method according to claim 12 wherein the alcohol ethoxylate/propoxylate component has a molecular weight of at least about 630.

16. The method according to claim 15 wherein the alcohol ethoxylate/propoxylate component has a molecular weight of about 630 to 3,000.

17. The method according to claim 16 wherein the alcohol ethoxylate/propoxylate component has a molecular weight of about 1,200 to 3,000.

18. The method according to claim 1 wherein the emulsifier component comprises at least one nonionic surfactant.

19. The method according to claim 18 wherein the emulsifier component comprises at least one anionic surfactant.

20. The method according to claim 1 wherein the aqueous foam control composition further comprises at least one branched alcohol component.

21. The method according to claim 1 wherein the aqueous composition foam control further comprises at least one of stabilizing and thickening agents.

22. The method according to claim 1 wherein the emulsifier component comprises up to about 1.0 weight percent of at least one anionic surfactant, and from about 0.2 to 5.0 weight percent of at least one nonionic surfactant.

23. The method according to claim 22 wherein the at least one nonionic surfactant comprises at least one alcohol ethoxylate.

24. The method according to claim 22 wherein the emulsifier component comprises at least one water soluble alcohol ethoxylate and at least one water insoluble alcohol ethoxylate.

25. The method according to claim 1 wherein the aqueous system is a papermaking system.

* * * * *